April 3, 1962 F. C. ALPERS 3,028,555
PRECISION TIME INTERVAL GENERATOR
HAVING INTEGRATING STAGES
Filed July 26, 1960 3 Sheets-Sheet 1

INVENTOR.
FREDERICK C. ALPERS
BY

INVENTOR.
FREDERICK C. ALPERS

April 3, 1962

F. C. ALPERS 3,028,555

PRECISION TIME INTERVAL GENERATOR
HAVING INTEGRATING STAGES

Filed July 26, 1960

INVENTOR.
FREDERICK C. ALPERS
BY

United States Patent Office 3,028,555
Patented Apr. 3, 1962

3,028,555
PRECISION TIME INTERVAL GENERATOR
HAVING INTEGRATING STAGES
Frederick C. Alpers, Riverside, Calif., assignor to the United States of America as represented by the Secretary of the Navy
Filed July 26, 1960, Ser. No. 45,506
1 Claim. (Cl. 328—127)
(Granted under Title 35, U.S. Code (1952), sec. 266)

The invention herein described may be manufactured and used by or for the Government of the United States of America for governmental purposes without the payment of any royalties thereon or therefor.

The present invention relates to a precision time interval generator and more particularly to a precision time interval generator for accurately measuring the range of a radar signal.

An object of the invention is the provision of an improved radar ranging system of the character described.

Another object is to provide an extremely accurate time interval generator for use with radar ranging.

A further object of the invention is the provision of a precision time interval generator which is independent of repetition frequency of equipment being tested within wide limits and can be used with frequency modulated or noise modulated repetition frequencies.

Other objects and many of the attendant advantages of this invention will become readily appreciated as the same becomes better understood by reference to the following detailed description when considered in connection with the accompanying drawings wherein.

Figure 1:
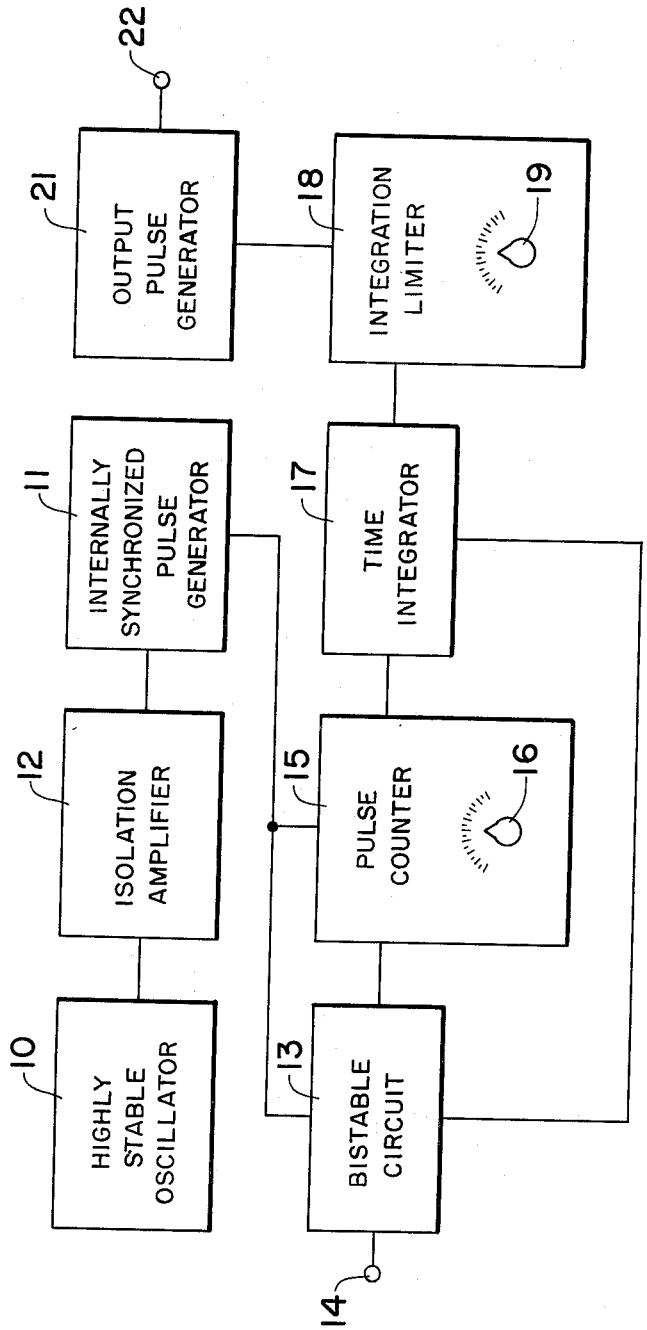
FIGURE 1 is a block diagram of one embodiment of the invention.

Referring now to the drawings, wherein like reference characters designate like or corresponding parts throughout the several figures, there is shown in FIGURE 1 a highly stable oscillator 10 which may be of the crystal type which gives out approximate sine waves at a frequency whose period is many times shorter than the delay to be measured. Coupled to the output of oscillator 10 is an internally synchronized pulse generator 11 of the blocking oscillator type for generating short electrical impulses, through isolation amplifier 12 which may be a cathode follower to keep later circuits from affecting the frequency of oscillator 10.

A D.-C. coupled multivibrator 13 or other bistable circuit which can be keyed into one condition and will remain in that condition until keyed back into its initial condition, has a first input terminal 14 to which a trigger pulse may be applied. The output of pulse generator 11 is also coupled as an input to bistable circuit 13.

Pulse counter 15 may be a series of bistable elements connected in one of several well known ways so as to count electric impulses received and give an output impulse when a certain count, as adjusted by dial 16 is reached. If desired a standard electronic test equipment item known as a "preset counter" might be used. Pulse counter 15 has a first input from pulse generator 11 and a second input from bistable circuit 13. Time integrator 17 has an input from the output of pulse counter 15 and an input from one of the outputs of bistable circuit 13. Integrator 17 may be a sawtooth waveform generator or other time integrating device which gives an electrical output signal which is proportional to the time elapsed since an initial triggering signal has been applied.

Integration limiter 18 is coupled to the output of time integrator 17 for generating an output pulse whenever an electrical signal from integrator 17 becomes sufficient in amplitude to correspond to another signal set into it manually by dial 19. The output pulse from limiter 18 is coupled to output pulse generator 21 for producing a pulse at output terminal 22.

The operation of the circuit shown in FIGURE 1 will be described in conjunction with the voltage waveforms of FIGURE 2. A trigger in pulse, indicative of the start of the time interval to be measured, is applied to terminal 14 of bistable circuit 13. This causes bistable circuit 13 to switch conditions and to initiate action by time integrator 17. Bistable circuit 13 then remains in the triggered condition until such time as the measurement can be translated from the time reference system of the external equipment (radar initiating pulse marker) to the precision time reference system of highly stable oscillator 10. This time is shown in FIGURE 2 by the quantity X.

Oscillator 10, amplifier 12 and pulse generator 11 operate steadily in their own time reference system with no requirement for frequency or phase relationship with the external circuit. The synchronized generator 11 then puts out electrical pulses in synchronism with the frequency-stable signal from oscillator 10.

The first pulse from generator 11 to occur following the trigger-in pulse at terminal 14 returns bistable circuit to its original condition, which in turn suspends action by time integrator 17. Upon being returned to its initial condition, bistable circuit also supplies a signal to start action by pulse counter 15. Counter 15 then counts pulses one, two, three and four received from generator 11 and continues to do so until a count equal to that set on dial 16 is reached, at which time it passes on the last pulse to time integrator 17. This is pulse four shown in FIGURE 2.

Figure 2:
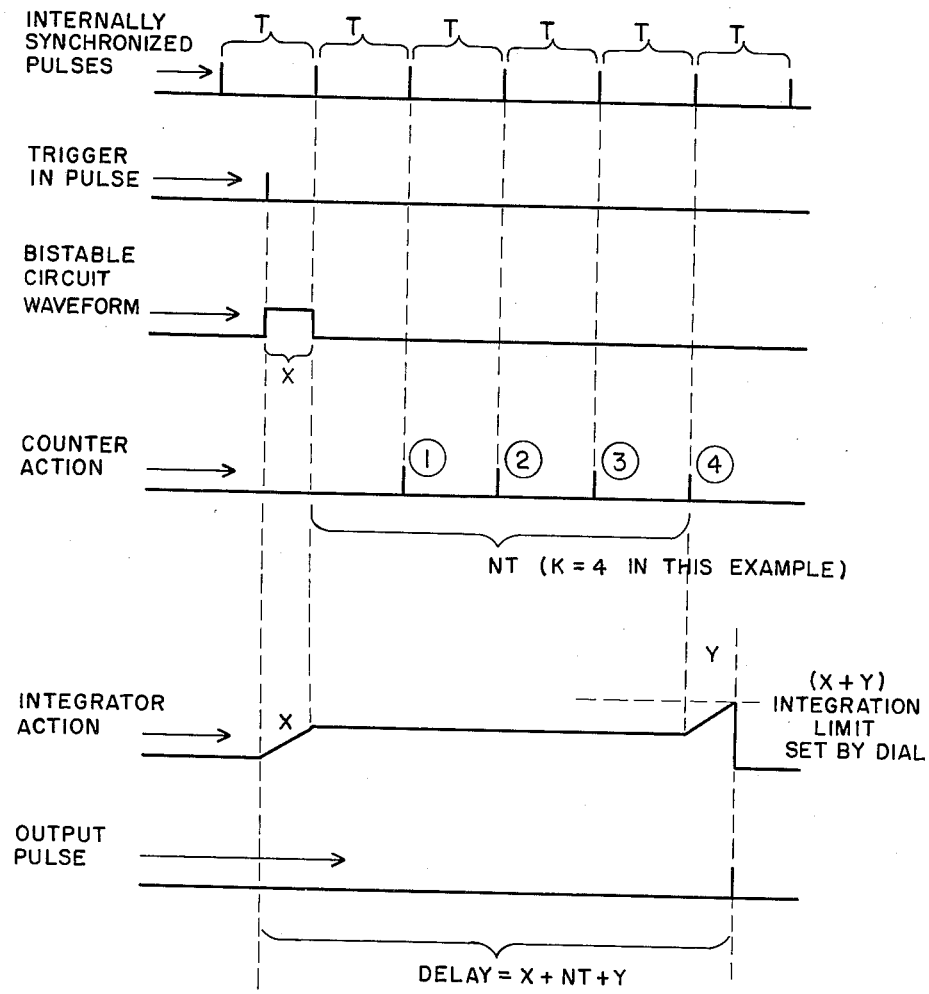
FIGURE 2 is a diagram of voltage waveforms referred to hereinafter in explaining the invention.

This last pulse causes time integrator 17 to resume integration (as shown in FIGURE 2) at the level where it was caused to suspend integration by bistable circuit 13. Integration is continued until the output of integrator 17 corresponds to the limit set on the dial in integration limiter 18. When the limit is reached, pulse generator 21 is caused to generate a pulse of desired characteristics to an external device which may be under test. As shown in FIGURE 2, the delay, d, is expressed by the equation:

$$d = X + NT + y$$

where X is the time between the trigger-in and the first internally synchronized pulse, y is the time between the last internally synchronized pulse and the limiting action, T is the period of the highly stable oscillator, and N is the number of counts set on dial 16 (FIGURE 1). Thus, the delay is the sum of two fractions, a large and extremely accurate one, NT, which is controlled by setting N on the counter dial, and a small necessary less accurate one (X+y), which is controlled by setting the incremental limiter dial 19. The timing of the output pulse is compared to an output pulse developed at the instant of reaction of the external device under test. The delay, d, is then adjusted by the dials of counter 16 and limiter 19 until the two outputs pulses occur in time coincidence, and the reaction time is read directly from the dials. In the case of radar range measurements, the transmitter pulse of the radar would be used as the trigger-in, and the output pulse from the above device would be aligned to occur in time coincidence with a chosen radar echo pulse by comparison of the range of the two on the radar indicator screen. After alignment and with suitable marking of the dials, the range of that echo could be determined with extreme accuracy even at long ranges.

Figure 3:
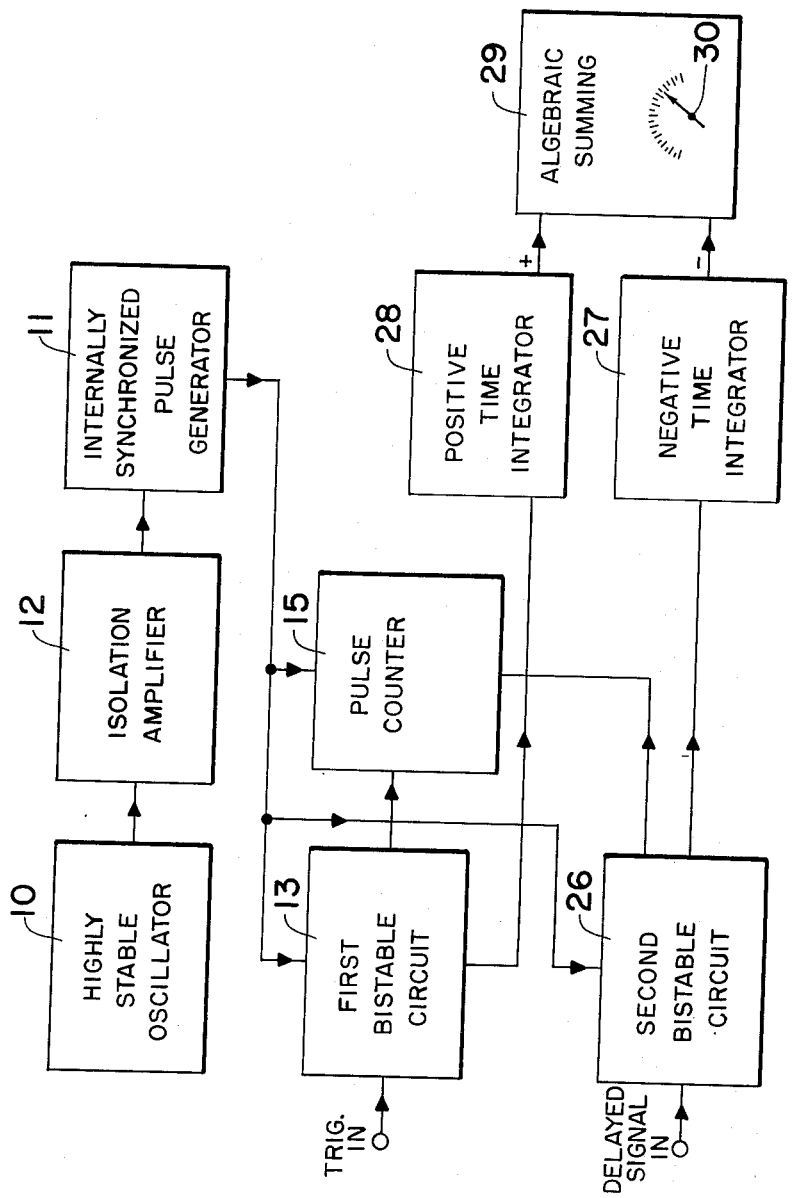
FIGURE 3 is a block diagram of a modification of the embodiment of FIGURE 1.

FIGURE 3 shows a modification for automatic recording. In this embodiment oscillator 10, amplifier 12, pulse generator 11, bistable circuit 13, and counter 15 function in the same manner as in FIGURE 1 except that counter 15 does not stop at any particular count. Instead the occurrence of the delayed signal in the external device causes action through a second bistable circuit 26 to stop the count, which is then displayed on an indicating system (not shown). Bistable circuit 26 switches conditions at the instant of occurrence of the delayed signal and returns to its original condition at the time of the next pulse from generator 11. The output of bistable circuit 26 is integrated by integrator 27 whose output goes negative with time in the same manner that the output of bistable circuit 13 is integrated by positive going integrator 28. An algebraic summation of the outputs of integrators 27, 28 is made and indicated on adder 29 and indicator 30. It will be apparent that the time delay $d$ between the trigger-in pulse and the delay signal is then expressed by the equation:

$$d = X + NT - y = NT + (X - y)$$

which is the output of counter 15 plus the algebraic sum 30.

Obviously many modifications and variations of the present invention are possible in the light of the above teachings. It is therefore to be understood that within the scope of the appended claim the invention may be practiced otherwise than as specifically described.

What is claimed is:

A precision time interval generator comprising in combination a source of stable oscillation: pulse generator means coupled to said oscillations source for producing electric impulses synchronized with said oscillations; first and second bistable circuit means; said first bistable circuit means having a first input terminal adapted to have a trigger-in signal applied thereto, a second input terminal coupled to the output of said pulse generator means, and having first and second outputs; said second bistable circuit means having a first input terminal adapted to have a delayed signal-in applied thereto, a second input terminal coupled to the output of said pulse generator means and having first and second outputs; a pulse counter having a first input coupled to the output of said pulse generator means, a second input coupled to the first output of said first bistable circuit means, a third input coupled to the first output of second bistable circuit means; positive time integrator means coupled to the second output of said first bistable circuit means for generating a voltage of a magnitude that is proportional to the time said first bistable circuit means is in a first condition and of a duration at the maximum magnitude until the delayed signal is received at said second bistable circuit; negative time integrator means coupled to the second output of said second bistable circuit means for generating a voltage of a magnitude that is proportional to the time the delayed signal is received and the next occurrence of a pulse from said pulse generator means; summing means coupled to said positive and negative time integrators for producing a signal voltage output which is indicative of the delay of said delayed signal.

References Cited in the file of this patent

UNITED STATES PATENTS

| | | |
|---|---|---|
| 2,422,698 | Miller | June 24, 1947 |
| 2,646,510 | Musselman | July 21, 1953 |
| 2,832,044 | Bliss | Apr. 22, 1958 |